United States Patent [19]

Summers

[11] Patent Number: 4,491,299
[45] Date of Patent: Jan. 1, 1985

[54] EXTENDED HUB VALVE CLOSURE MEMBER

[75] Inventor: Anthony C. Summers, St. Cloud, Minn.

[73] Assignee: General Signal Corporation, Stamford, Conn.

[21] Appl. No.: 414,869

[22] Filed: Sep. 3, 1982

[51] Int. Cl.³ ............................................. F16K 1/22
[52] U.S. Cl. .................................. 251/308; 251/306; 251/368
[58] Field of Search ............... 251/305, 306, 307, 308, 251/368

[56] References Cited

U.S. PATENT DOCUMENTS

| | | | |
|---|---|---|---|
| 2,729,238 | 1/1956 | Hite | 251/305 |
| 3,081,791 | 3/1963 | Wheatley | 137/454.2 |
| 3,343,805 | 9/1967 | Felton | 251/306 |
| 3,567,180 | 3/1971 | Williams | 251/306 |
| 3,589,678 | 6/1971 | Magoon | 251/306 |
| 4,022,424 | 5/1977 | Davis et al. | 251/305 |
| 4,162,782 | 7/1979 | Wilkins | 251/173 |
| 4,176,820 | 12/1979 | Broadway | 251/306 |
| 4,235,418 | 11/1980 | Natalizia | 251/368 |
| 4,254,937 | 3/1981 | Hubertson | 251/305 |
| 4,373,542 | 2/1983 | Scaramucci | 251/308 |
| 4,394,003 | 7/1983 | Whitaker | 251/306 |

FOREIGN PATENT DOCUMENTS 1107380  3/1968  United Kingdom .

Primary Examiner—Martin P. Schwadron
Assistant Examiner—James R. Shay
Attorney, Agent, or Firm—Barnes & Thornburg

[57] ABSTRACT

A valve closure member with a hub which extends beyond the radius of the circumferential sealing region of the closure member to a point greater than the extended edge of the lip of the valve seat recess in the valve body. The extended hub is spaced from the circumferential sealing region by a recess to receive a portion of the lip when the closure member is rotated.

5 Claims, 4 Drawing Figures

EXTENDED HUB VALVE CLOSURE MEMBER

BACKGROUND OF THE INVENTION

The present invention relates generally to rotary valves and, more specifically, to rotary valves having disc locators.

Rotary valves generally include a closure member which is pivotally connected to the housing by a shaft. Locator or spacer means are provided on the shaft extending between the movable member and the body to locate the movable member along the axis of the shaft in the body. The positioning or centering is very important to achieve a good seal. The length of the locator along the axis of the shaft determines the length of the unsupported shaft exposed to bending forces. The larger the fluid pressure to which the closure member is exposed and the greater the length of unsupported shaft, the greater the deflection and bending of the shaft for which the shaft must be designed. With prior art disc locators of substantial length, the diameter of the shaft is substantial to accommodate and minimize deflection and bending of the shaft. This is especially true in high pressure environments and closure members having a diameter about 14 inches and larger.

SUMMARY OF THE INVENTION

An object of the present invention is to provide an improved rotary valve structure having a minimum length closure member locators.

Another object of the present invention is to provide an improved rotary valve which minimizes the shaft deflection and bending.

Still another object of the present invention is to provide a disc valve having a minimum diameter shaft connecting the disc and valve body.

A still further object of the present invention is to provide an offset hub disc valve having a minimum diameter shaft between the hub and the body and minimum length disc locators.

A still even further object is to provide a rotary valve structure without locators.

These and other objects of the invention are attained by forming an extended hub on the rotary closure member which extends beyond the circumferential sealing region thereof and past the extended edge of the lip of the valve seat recess in the body. The shape of the extended hub provides a recess between the extended hub and the remainder of the closure member to receive the valve lip when the closure member is rotated. The extended hub may have a cylindrical or curved shape and extend radially from a point less than the radius of the circumferential sealing portion to a point greater than the radius of the lower edge of the lip of the valve seat recess. The locator length along the shaft axis is reduced to less than the length of the lip along the shaft axis. With treatment of the adjacent surfaces of the extended hub and valve body to prevent galling and seizing, no disc locator is necessary.

Other objects, advantages and novel features of the present invention will become apparent from the following detailed description of the invention when considered in conjunction with the accompanying drawings.

DESCRIPTION OF THE PREFERRED EMBODIMENTS

Figure 1:
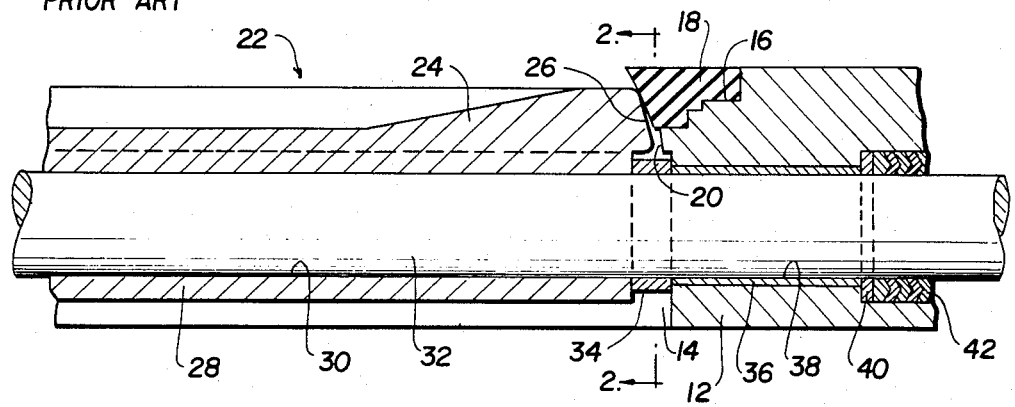
FIG. 1 is a cross-sectional view of a rotary valve of the prior art.
Figure 2:
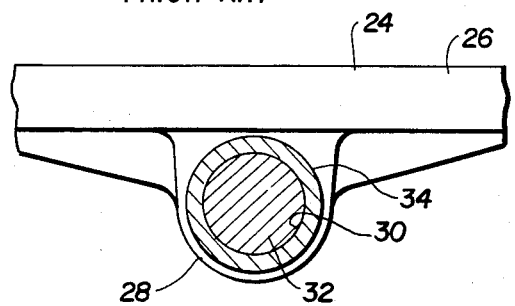
FIG. 2 is a partial top view taken along the lines II—II of FIG. 1.

FIG. 1 illustrates a prior art rotary valve as a disc valve including a body 12 with a flow passage 14 therein. An annular circumferential recess 16 is provided in the housing 12 which receives an annular valve seat 18. The valve seat 18 is retained in the recess 16 by a retainer (not shown) or an opposing face of the system in which the valve is mounted. The recess 18 includes a lip 20 extending radially from the housing 12 into the flow passage 14. A valve closure member 22 includes a disc 24 having a circumferential sealing region 26 which rests against the extended valve seat 18. A hub 28 on the backside of the disc 24 includes a bore 40 whose axis is transverse to the axis of the flow passage 14. A shaft 32 extends from a bore 36 in the body 12 through the bore 30 of the hub 28 to rotatably mount the closure member 22 to the body 12. A disc locator 34 extends from the top edge of the hub 28 to the inside edge of the body 12 about the shaft 32. A shaft bearing 38 is provided in the bore 36 of the body as well as gland washer 40 and seal 42.

Although FIG. 1 illustrates only one end of the closure member 22 and the body 12, a disc locator is provided on the other end where the shaft 32 extends between the hub 30 and the body 12.

As can be seen from FIG. 1, the hub 28 terminates radially below the edge of the disc 24 and the circumferential sealing region 26. Thus, the disc locator 24 extends from a point less than the radius of the circumferential sealing edge 26 to a point past the inner edge of the lip 20. The length of the locator 34 is substantial. For example, for a disc having a diameter of the circumferential sealing surface of thirty inches, the length of the disc locator 34 is approximately one inch. The portion of the shaft encompassed by the locator 34 is unsupported and is exposed to bending forces. Line pressure against the closure member 22 creates a load that tends to deflect and bend the shaft. To minimize this deflection and bending, the diameter of shaft 32 is chosen sufficiently large. For a disc having a diameter of thirty inches, the shaft 32 will generally have a diameter of three and one half inches.

Figure 4:
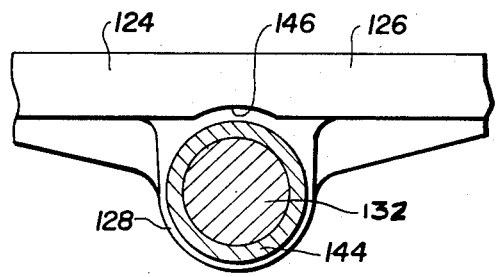
FIG. 4 is a partial view taken along the lines IV—IV of FIG. 3.
Figure 3:
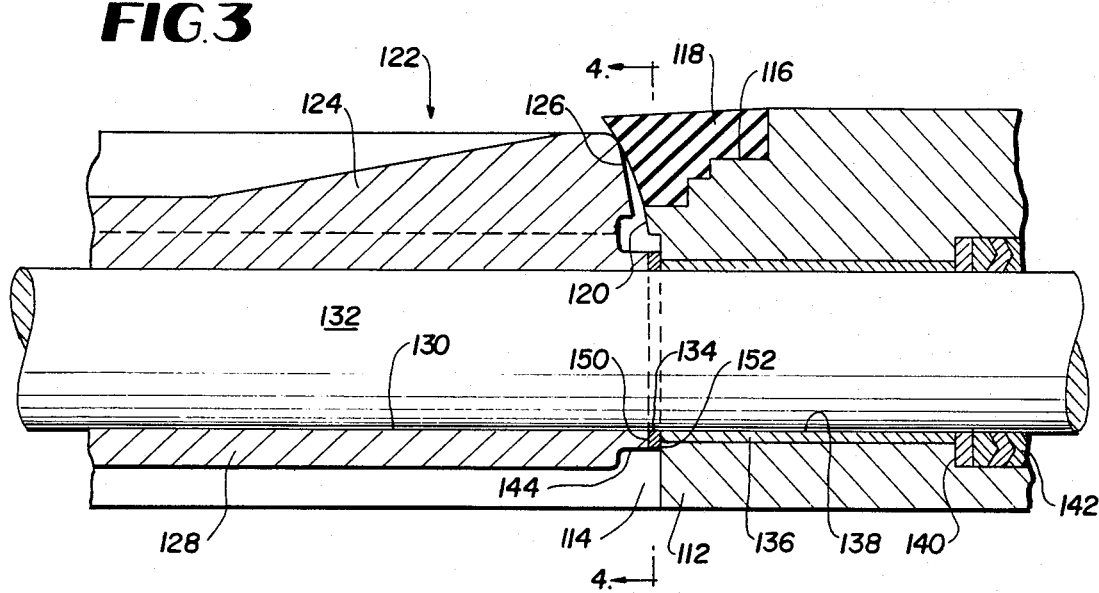
FIG. 3 is a partial cross-section of a rotary valve incorporating the principles of the present invention.

In an effort to reduce the amount of unsupported shaft, FIGS. 3 and 4 illustrate a rotary valve incorporating the principles of the present invention. The body 112 includes a flow passage 114 and an annular circumferential recess 116 receiving the valve seat 118. The recess 116 includes a lip 120 extending into the flow passage 114. The rotary closure member 122 includes a disc portion 124 with a circumferential sealing region 126. A hub 128 on the backside of the disc 124 includes a bore 130 to receive shaft 132 which extends into bore 136 of the housing. Shaft bearing 138, gland washer 140 and seal 142 are provided in bore 136 of the body 112. The hub 128 includes an extended hub portion 144 extending radially from a point less than the radius of the sealing region 126 to a point greater than the radius of the extended edge of the lip 120. A disc locator 134 is provided between the end of the extended hub 144 and the body 112 about the shaft 132.

As can be noted from FIG. 3, the length of the disc locator 134 along the axis of shaft 132 is less than the length of the lip 120. This disc locator length is substantially less than the length of the prior art disc locator 34, shown in FIG. 1. For example, for a disc 122 having a diameter to the circumferential sealing region 126 of thirty inches, the disc locator 134 has a length of 0.045 inch. Thus, it can be seen that the length of unsupported shaft 132 has been minimized. Similarly, because the unsupported length of the shaft has been reduced, the diameter of shaft 132 may also be reduced. For the disc 122 having a diameter of thirty inches, the diameter of shaft 132 may be reduced to three inches. It should also be noted that the disc locator 134 does not extend beyond the lip 120 and, thus, the disc locator and the portion of the shaft in which it encompasses does not receive the same amount of fluid pressure since the lip 120 forms a flow stop or diverter.

Since the disc 122 rotates 90° through the fluid passage 114, the extended hub 144 must have an outside diameter less than the distance of the lip from the axis of the shaft 132. The back of the disc 124 has an arcuate notch 146 therein. The space between the hub 144 and the back of disc 124 receives the lip 120 as it rotates between its opened and closed positions.

The optimal case is no disc locator. In the present invention the top surface 150 of the extended hub and the adjacent surface 152 of the body 112 are specifically treated to prevent galling and siezing. This, treatment may include plating chrome, nickel or other anti-galling materials.

Although the present invention has been described wherein the closure members 22 and 122 are a disc and the overall valve is considered a butterfly valve, other rotatable valves may incorporate the principles of the present invention. For example, the closure member may be a ball valve and may equally take advantage of an extended hub to minimize the size of the disc locator. Similarly, although the present device has been illustrated as showing a single shaft extending through a single hub, it should be noted that hub 28 and 128 may be a pair of hubs each receiving a separate shaft. In the large high pressure valves, it is preferred that a single extended hub 128 and shaft 132 be used.

Although the present invention is particularly designed for valves 14 inch and larger standard pipe size and for higher pressure ratings, it is applicable to any size and pressure rating.

From the preceding description of the preferred embodiment, it is evident that the objects of the invention are attained and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. In a rotary valve having a body with a flow passage, an annular circumferential recess in said body for receiving a valve seat, said annular circumferential recess includes a lip extending into said flow passage, a bore in said body whose axis is transverse to the axis of said flow passage, a closure member in said flow passage, a bore in said closure member, a shaft in said bores for rotatably mounting said closure member to said body, a circumferential sealing region on said closure member for forming a seal with a valve seat in said annular circumferential recess, a locator means about said shaft extending between said closure member and said valve body for locating said closure member in said flow passage along the axis of said shaft, the improvement comprising:

a cylindrical hub on said closure member about said bore and spaced from said closure member and extending radially from a point less than the radius of said closure member to a point greater than the radius of said closure member, the space between said extended portion of said hub and said closure member receives a portion of said lip when said closure member is rotated;

the length of said locator means along said shaft axis being substantially reduced.

2. The rotary valve according to claim 1, wherein the back surface of said disc opposite said extended portion of said hub has an arcuate notch.

3. In a rotary valve having a body with a flow passage, an annular circumferential recess in said body for receiving a valve seat, said annular circumferential recess includes a lip extending into said flow passage, a bore in said body whose axis is transverse to the axis of said flow passage, a closure member in said flow passage, a bore in said closure member, a shaft in said bore for rotatably mounting said closure member to said body, a circumferential sealing region on said closure member for forming a seal with a valve seat in said annular circumferential recess, a locator means about said shaft extending between said closure member and said valve body for locating said movable member in said flow passage along the axis of said shaft, the improvement comprising:

a hub on said closure member about said bore and extending from said closure member radially beyond said circumferential sealing region and past the extended edge of said lip;

the length of said locator means along said shaft axis being substantially reduced; and said closure member including a recess means between said hub and said circumferential sealing region for receiving a portion of said lip when said closure member is rotated.

4. The rotary valve according to claim 3, wherein said locator means has a length along said shaft axis less than the length of said lip along said shaft axis.

5. The rotary valve according to claim 3, wherein said hub extends to said valve body; and wherein said locator means comprises a thin layer of anti-galling material plated on the adjacent surfaces of said hub and said body.

* * * * *